United States Patent
Williams et al.

(10) Patent No.: US 6,852,978 B2
(45) Date of Patent: Feb. 8, 2005

(54) CRYSTAL-BASED COINCIDENCE TIMING CALIBRATION METHOD

(75) Inventors: John J. Williams, Hartland, WI (US); Dershan Luo, Brookfield, WI (US); Mark K. Limkeman, Brookfield, WI (US); Michael J. Cook, Oconomowoc, WI (US); David L. McDaniel, Dousman, WI (US); Edwin L. Oswalt, Waukesha, WI (US); Mark P. Feilen, Mukwonago, WI (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 10/284,800

(22) Filed: Oct. 31, 2002

(65) Prior Publication Data

US 2004/0084625 A1 May 6, 2004

(51) Int. Cl.[7] .......................... G01T 1/172; G01T 1/161
(52) U.S. Cl. .............................. 250/363.03; 250/363.09
(58) Field of Search ...................... 250/363.03, 363.02, 250/363.07, 363.09, 252.1

(56) References Cited

U.S. PATENT DOCUMENTS

| | | | |
|---|---|---|---|
| 5,241,181 A | | 8/1993 | Mertens et al. |
| 5,272,343 A | | 12/1993 | Stearns |
| 5,272,344 A | | 12/1993 | Williams |
| 6,232,604 B1 | | 5/2001 | McDaniel et al. |
| 6,255,655 B1 | * | 7/2001 | McCroskey et al. ... 250/363.03 |
| 6,327,546 B1 | * | 12/2001 | Petrillo et al. ................ 702/89 |
| 6,348,692 B1 | * | 2/2002 | Chapuis et al. ............. 250/369 |
| 6,376,841 B1 | * | 4/2002 | Petrillo et al. ......... 250/363.03 |
| 2004/0016884 A1 | * | 1/2004 | Williams et al. ........ 250/363.09 |

OTHER PUBLICATIONS

Mark W. Lenox et al., IEEE, "Coincidence Time Alignment for Planar Pixellated Positron Emission Tomography Detector Arrays", pp. 1–3, 2002.

* cited by examiner

Primary Examiner—Albert Gagliardi
(74) Attorney, Agent, or Firm—Hunton & Williams LLP (57) ABSTRACT

A method of calibrating detectors in a detector ring of a PET scanner, each detector including a plurality of crystals, the PET scanner having a field of view, is disclosed. The method comprises collecting timing data indicative of coincidence events occurring between each pair of crystals within the field of view. The method further comprises determining a detector adjustment value for each detector, determining a crystal adjustment value for each crystal in each detector, and discretizing the crystal adjustment value for each crystal to produce a discretized crystal adjustment value for each crystal. Lastly, the method comprises calibrating each detector by applying the discretized crystal adjustment value for each crystal in each detector to the collected timing data indicative of coincidence events.

30 Claims, 7 Drawing Sheets

CRYSTAL-BASED COINCIDENCE TIMING CALIBRATION METHOD

BACKGROUND OF THE INVENTION

The invention relates generally to positron emission tomography (PET) and more particularly to the coincidence timing calibration of PET systems.

Positrons are antimatter electrons which are emitted by radionuclides that have been prepared using a cyclotron or other device. The radionuclides are employed as radioactive tracers called "radiopharmaceuticals" by incorporating them into substances which are introduced into the patient and become involved in such processes as glucose metabolism, fatty acid metabolism and protein synthesis.

As the radionuclides decay, they emit positrons. The positrons travel a very short distance before they encounter an electron, and when this occurs, a matter-antimatter annihilation converts them into two photons, or gamma rays. This annihilation event is characterized by two features which are pertinent to PET scanners. Each gamma ray has an energy of 511 keV and the two gamma rays are directed in substantially opposite directions. An image is created by determining the number of such annihilation events at each location within the field of view.

The PET imaging system, or scanner, includes one or more rings of detectors which encircle the patient and which convert the energy of each 511 keV photon into a flash of light that is sensed by a photomultiplier tube (PMT). Each detector is typically comprised of thirty-six (36) crystals, arranged in a 6×6 array. Coincidence detection circuits connect to the detectors and record only those photons which are detected simultaneously by two detectors located on opposite sides of the patient. The number of such simultaneous events indicates the number of positron annihilations that occurred along a line joining the two opposing detectors. Within a few minutes, millions of events are recorded to indicate the number of annihilations along lines joining pairs of detectors in the ring. This data is used to reconstruct an image.

One important calibration procedure in a PET scanner is the coincidence timing calibration ("CTC"). The purpose of CTC is to correct for relative timing differences in the detectors and the front end electronics of the PET scanner. Some PET scanners utilize a CTC method that calculates a time adjustment value for each detector within the detector rings of the PET scanner. This method is described in U.S. Pat. No. 5,272,344, entitled "Automated Coincidence Timing Calibration For A PET Scanner." However, timing variations still exist among the crystals within each detector, owing to various factors, including non-uniformity of the PMT cathode response, and different electronic circuits and components through which signals coming from different anodes pass. Since when and where the coincidence events takes place is identified with the crystal, not only the detector, the accuracy of the crystal timing directly affects the ability of accepting true coincidence events and rejecting random events. Therefore, there is a need for an accurate and efficient method for determining a crystal adjustment value for each crystal within each detector located in the PET scanner detector rings.

The invention provides systems and methods for coincidence timing calibration of PET systems, that overcome the disadvantages of known systems and methods.

BRIEF SUMMARY OF THE INVENTION

In accordance with one embodiment of the invention, a method of calibrating detectors in a detector ring of a PET scanner, each detector including a plurality of crystals, the PET scanner having a field of view, is disclosed. The method comprises collecting timing data indicative of coincidence events occurring between each pair of crystals within the field of view. The method further comprises determining a detector adjustment value for each detector, determining a crystal adjustment value for each crystal in each detector, and discretizing the crystal adjustment value for each crystal to produce a discretized crystal adjustment value for each crystal. Lastly, the method comprises calibrating each detector by applying the discretized crystal adjustment value for each crystal in each detector to the collected timing data indicative of coincidence events.

In another embodiment of the invention, a method of calibrating the coincidence timing of a PET imaging system including a plurality of detector rings, each detector ring including a plurality of detectors with a plurality of detector crystals, is disclosed. The method comprises collecting timing data indicative of coincidence events occurring between pairs of crystals within a field of view of the imaging system, determining a detector adjustment value for each detector, determining a crystal adjustment value for each crystal in each detector, determining an average crystal adjustment for each detector, and determining a model crystal adjustment value for each crystal in each detector. The method further comprises discretizing the model crystal adjustment value for each crystal using a first threshold to produce a first discretized crystal adjustment value for each crystal, determining a first average discretized crystal adjustment for each detector, and determining a first difference for each detector, the first difference representing the first average discretized crystal adjustment less the detector adjustment value. The method further comprises determining a second threshold for each detector using the first difference, discretizing the model crystal adjustment value for each crystal using the second threshold to produce a second discretized crystal adjustment value for each crystal, determining a second average discretized crystal adjustment for each detector, and determining a second difference for each detector, the second difference representing the second average discretized crystal adjustment less the detector adjustment value. Lastly, the method comprises calibrating each detector by applying the second discretized crystal adjustment value for each crystal in the detector to the collected timing data indicative of coincidence events if the second difference is less than the first difference, and applying the first discretized ideal crystal adjustment value for each crystal in the detector to the collected timing data indicative of coincidence events if the second difference is equal to or greater than first difference.

In yet another embodiment of the invention, a method of calibrating the coincidence timing of a detector in a PET imaging system, the detector including a plurality of detector crystals, is disclosed. The method comprises collecting timing data indicative of coincidence events occurring between pairs of crystals within a field of view of the imaging system, determining a detector adjustment value for a detector, determining a crystal adjustment value for each crystal in the detector, determining an average crystal adjustment for the detector, and determining a model crystal adjustment value for each crystal in the detector. The method further comprises discretizing the model crystal adjustment value for each crystal using a first threshold to produce a first discretized crystal adjustment value for each crystal, determining a first average discretized crystal adjustment for the detector, and determining a first difference for the detector, the first difference representing the first average discretized crystal adjustment less the detector adjustment value. The method further comprises determining a second threshold for the detector using the first difference, discretizing the model crystal adjustment value for each crystal using the second threshold to produce a second discretized crystal adjustment value for each crystal, determining a second average discretized crystal adjustment for the detector, and determining a second difference for the detector, the second difference representing the second average discretized crystal adjustment less the detector adjustment value. Lastly, the method comprises calibrating the detector by applying the second discretized crystal adjustment value for each crystal in the detector to the collected timing data indicative of coincidence events if the second difference is less than the first difference, and applying the first discretized ideal crystal adjustment value for each crystal in the detector to the collected timing data indicative of coincidence events if the second difference is equal to or greater than first difference.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

A method of calibrating detectors in a detector ring of a PET scanner, each detector including a plurality of crystals, the PET scanner having a field of view, is disclosed. The method comprises collecting timing data indicative of coincidence events occurring between each pair of crystals within the field of view. The method further comprises determining a detector adjustment value for each detector, determining a crystal adjustment value for each crystal in each detector, and discretizing the crystal adjustment value for each crystal to produce a discretized crystal adjustment value for each crystal. Lastly, the method comprises calibrating each detector by applying the discretized crystal adjustment value for each crystal in each detector to the collected timing data indicative of coincidence events.

Figure 1:
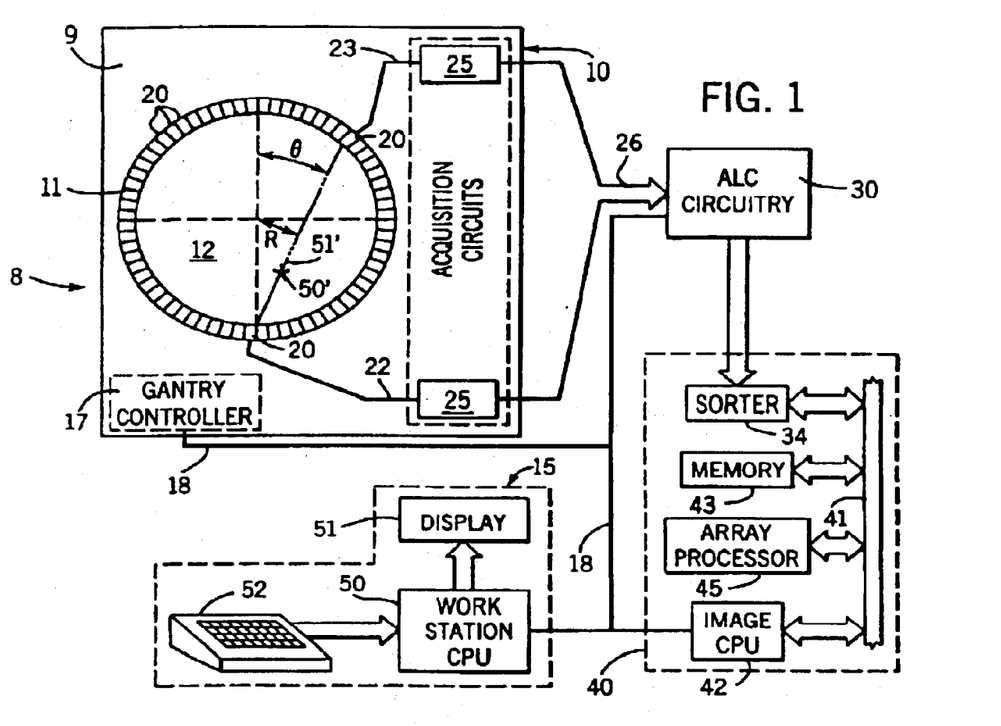
FIG. 1 is a schematic view of a PET system in accordance with one embodiment of the invention.

FIG. 1 is a schematic view of a PET system in accordance with one embodiment of the invention. As shown in FIG. 1, PET imaging system 8 includes an acquisition system 10, an operator work station 15, acquisition, locator and coincidence ("ALC") circuitry 30, and an image reconstruction processor 40.

System 10 includes a gantry 9 which supports a detector ring assembly 11 about a central bore which defines an imaging area 12. A patient table (not illustrated) is positioned in front of gantry 9 and is aligned with imaging area 12. A patient table controller (not illustrated) moves a patient table into imaging area 12 in response to commands received from work station 15 through a communications link 18.

A gantry controller 17 is mounted within gantry 9 and is responsive to commands received from operator work station 15 through link 18 to operate gantry 9. For example, gantry 9 can be tilted away from vertical on command from an operator, can perform a transmission scan with a calibrated radionuclide source to acquire attenuation measurements, can perform a coincidence timing calibration ("CTC") scan to acquire corrective data, or can perform a normal emission scan in which positron annihilation events are counted.

Figure 2:
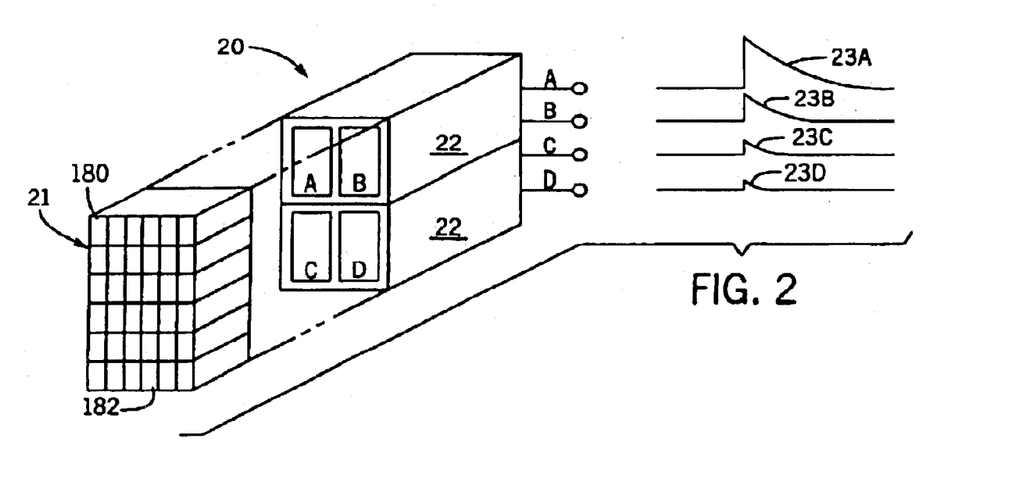
FIG. 2 is a perspective view of a detector and associated PMT signals in accordance with one embodiment of the invention.

FIG. 2 is a perspective view of a detector and associated PMT signals in accordance with one embodiment of the invention. As shown in FIG. 1, detector ring assembly 11 is comprised of a plurality of detectors 20. Although not illustrated, detectors 20 may be arranged in modules, each module including eight detectors 20. In one embodiment, detector ring assembly 11 includes thirty-five (35) separate modules such that detector ring assembly 11 includes two hundred and eighty (280) detectors 20, four (4) aligned axially and seventy (70) aligned transaxially. As shown in FIG. 2, each detector 20 includes a plurality of scintillator crystals 21, e.g., bismuth germinate ("BGO") crystals, arranged in a matrix (6×6) and disposed in front of four photo multiplier tubes ("PMT") A, B, C and D, collectively 22.

Figure 3:
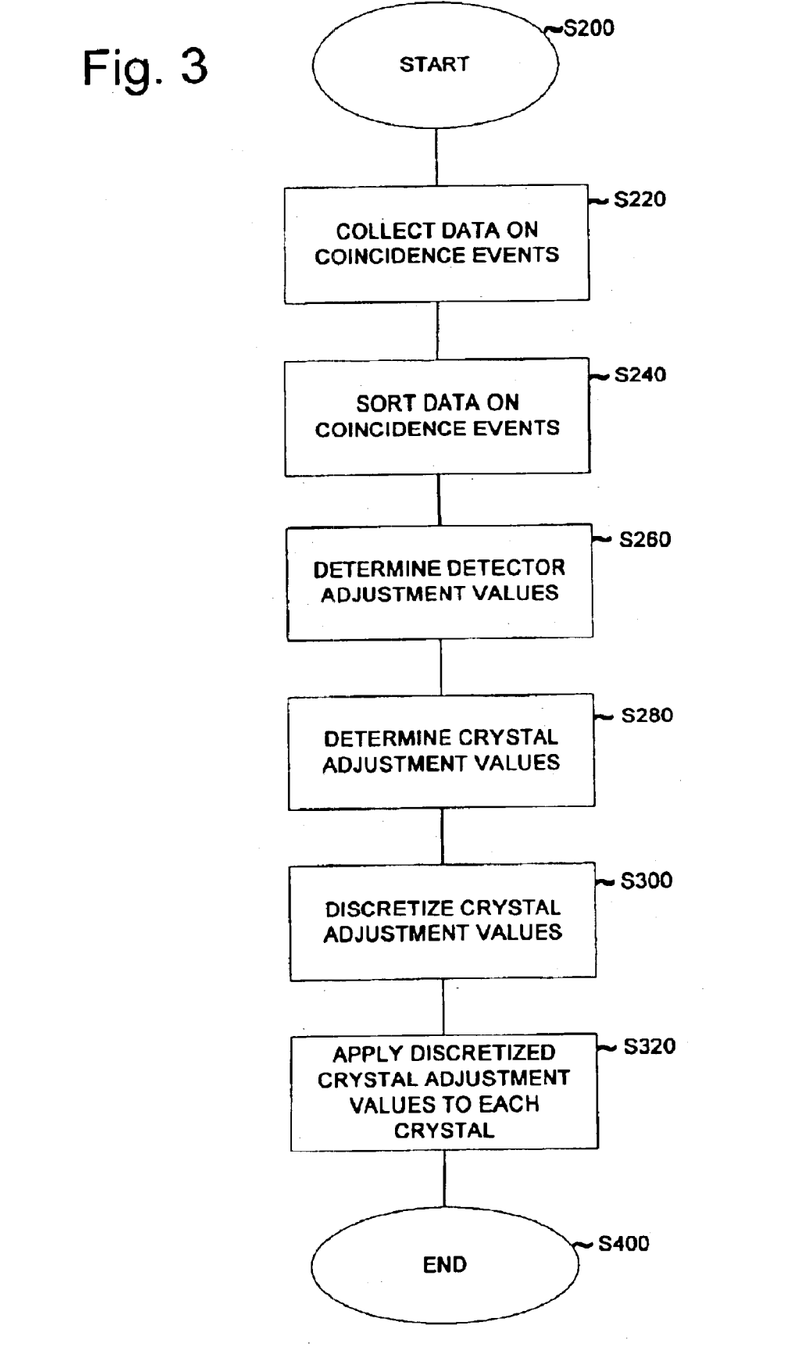
FIG. 3 is a flowchart illustrating one embodiment in accordance with the system and method of the invention.

FIG. 3 is a flowchart illustrating one embodiment of the invention. The process begins in step S200, and passes to step S220, in which timing data on coincidence events is collected. Referring to FIG. 2, when a photon impacts a crystal 21, a scintillation event occurs and the crystal generates light which is directed at PMTs 22. Each PMT 22 receives at least some light generated by the scintillation event and produces an analog signal 23A–23D which rises sharply when a scintillation event occurs then tails off exponentially with a time constant of approximately three hundred (300) nanoseconds. The relative magnitudes of the analog signals 23A–23D are determined by the position in the crystal matrix (6×6) at which a scintillation event takes place, and the total magnitude of these signals is determined by the energy of the photon that caused the event.

Referring still to FIGS. 1 and 2, acquisition circuitry 25 is mounted within gantry 9 to receive the four signals 23A–23D from each detector unit 20 in assembly 11. Acquisition circuitry 25 provides signals 23A–23D to ALC circuitry 30 via a data bus 26. ALC circuitry 30 uses the signals 23A–23D to determine the energy of a detected event, if the energy detected likely corresponds to a photon (i.e., rejects any detected events if the integrated energy of the event is outside the range of 511 keV±20%), the actual coordinates of a detected event within the block of BGO crystals 21, the time of the event (i.e. generates a time stamp) and compares event times to select coincidence pairs of events which are stored as coincidence data packets. Each coincidence data packet includes a pair of digital numbers which precisely identify the addresses of the two crystals 21 that detected an associated event. Operation of ALC circuitry 30 is explained more in detail below.

As the timing data on coincidence events is being collected, the timing data is sorted for further processing in step S240. The timing data, as measured between a pair of detectors crystals, is sorted for use in determining the relative time differences between individual crystals, as well as detectors. Utilizing the sorted information, the coincidence timing calibration adjustments for each crystal, and detector, can be established. However, a certain amount of timing data must be rejected to preserve the validity of the timing differences relative to one another. A series of determinations are utilized to determine whether the timing data, as represented in a timing difference for an event measured between two crystals, should be accepted or rejected. Two relevant conditions are whether the detector ring for each crystal is axially adjacent to or the same ring, and whether the crystals fall within the fan, or transaxial filed of view ("TFOV"), for the detector.

Figure 4:
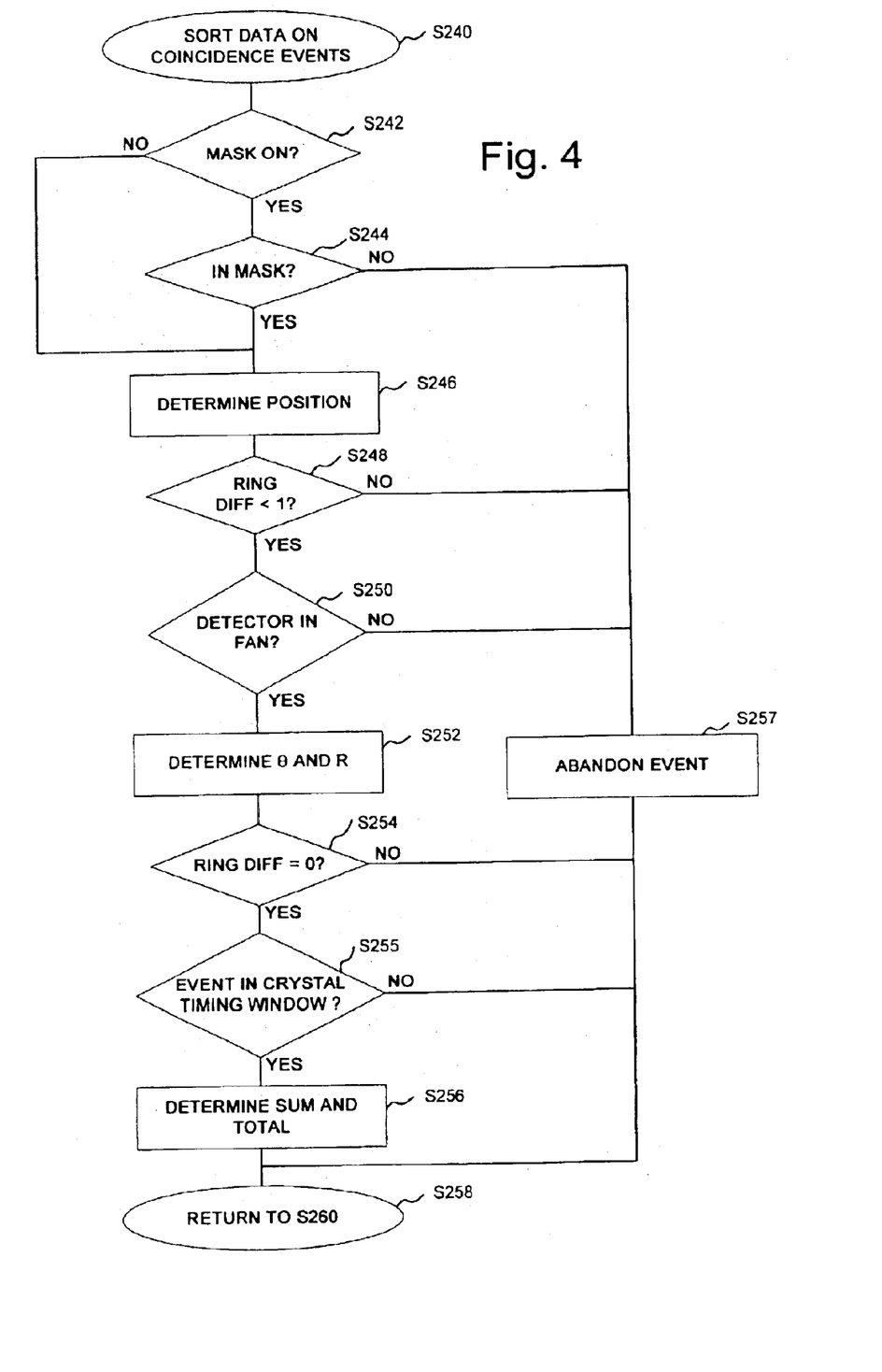
FIG. 4 is an illustrative flowchart showing the "sort data on coincidence events" step of FIG. 3 in further detail in accordance with one embodiment of the invention.

FIG. 4 is an illustrative flowchart showing the "sort data on coincidence events" step of FIG. 3 in further detail in accordance with one embodiment of the invention. As shown in FIG. 4, the process begins in step S240 and passes to step S242, wherein a determination is made whether the transmission mask is being used. If the transmission mask is being used, a determination is made in step S244, whether the two crystals that observed the event are within the transmission mask. If the crystals identified are within the transmission mask, the process passes to step S246. If the crystals identified are not within the transmission mask, the process passes to step S257, wherein the event is abandoned and the timing data is not stored. When the transmission mask is not in use, the process skips to step S246.

The specific location for each crystal is analyzed in step S246, including the detector in which each crystal is located, as well as the detector ring in which the detector holding the crystal is located. Then, in step S248, a determination is made whether the detector ring in which each crystal for the pair is located adjacent to each other, or both crystals are located in the same ring. In one embodiment, each detector ring is assigned a ring identifier, such that the detector rings aligned adjacent to each other in an axial direction are referred to as major ring 0, major ring 1, major ring 2 and major ring 3, respectively. The difference between the ring identifiers for each crystal involved is determined, and if that ring difference is less than or equal to one, the process passes step S250. Otherwise, the event is abandoned in step S257.

In step S250, a determination is made whether the detectors are in each other's fan, or transaxial field of view ("TFOV"). As shown in FIG. 1, detector ring assembly 11 is comprised of a plurality of detectors 20. In this embodiment, detector ring 11 is comprised of seventy (70) detectors in the transaxial view. When determining whether timing data will be accepted, the TFOV is symmetric in rejecting the same number of detectors 20 on each side. In this embodiment, the TFOV includes thirty-seven (37) detectors, and rejects data from the sixteen (16) detectors on either side of itself. It should be appreciated that each crystal within each detector is constrained by the same TFOV. If the detectors are in the TFOV, the process passes to step S252. Otherwise, the event is abandoned in step S257. In step S252, the event data is used to determine the projection angle θ and distance R, depicted in FIG. 1.

Referring to FIG. 1, processor 40 includes a sorter 34, a memory module 43, an array processor 45, an image CPU 42 and a backplane bus 41 which links all other processor components together. Sorter 34 generates memory addresses for the coincidence data packets to efficiently store the timing data on coincidence events. The set of all projection rays that point in the same direction and pass through the scanner's imaging area 12 is a projection, or "view". A distance R between a particular projection ray and a center of the imaging area 12 locates that projection ray within the imaging area 12.

As shown in FIG. 1, for example, a positron annihilation (hereinafter an "event") 50' occurs along a projection ray 51' which is located in a view at the projection angle θ and the distance R. The sorter 34 counts all of the events which occur on this projection ray (R, θ) during an acquisition period by sorting out the coincidence data packets that indicate an event at the two BGO crystals lying on ray 51'.

During timing data collection, the coincidence events are organized in memory 43 as a set of two-dimensional arrays, or histograms, each having as one of its dimensions the projection angle θ and the other dimension the distance R. Coincidence events occur at random and sorter 34 determines the θ and R values from the two crystal addresses in each coincidence data packet. The values of θ and R may be calculated as follows:

$$\theta = (\Phi_2 + \Phi_1)/2 + 90° \quad (1)$$

$$R = r_0 \cos[(\Phi_2 - \Phi_1)/2] \quad (2)$$

where $\Phi_1$=angular orientation of the first detector crystal;

$\Phi_2$=angular orientation of the second detector crystal;

$r_0$=radius of detector ring.

At the completion of an acquisition period, memory 43 stores the total number of events which occurred along each ray (R, θ) in the histogram.

While the histograms are constructed for each detector, timing data is analyzed to determine the crystal adjustment values for each individual crystal. In step S254, a determination is made for those coincidence pairs that have crystals in the same detector ring, i.e., the difference between major ring numbers is zero. For those coincidence pairs that have crystals in the same detector ring, the process passes to step S255, wherein the event is analyzed to determine whether if it falls within a crystal timing window. In this embodiment, the crystal timing window is equal to ±15 LSB. Coincidence pairs that do not fall within the crystal timing window are not utilized in the calculation of the Sum and Total for each crystal, and therefore, not represented in the crystal adjustment value for an individual crystal. For those coincidence pairs that fall within the crystal timing window, the process passes to step S256. Otherwise, the process skips to step S258.

In step S256, the Sum and Total for each crystal in the PET system is determined. Utilizing the crystal timing data based on θ and R, the timing difference between a crystal and each crystal in its detector ring and within its TFOV can be determined. The timing difference, relative to other crystals within its ring, can be used to compare the floating adjustments for each crystal such that an adjustment for each individual crystal can be formulated to produce better coincidence timing calibration while still maintaining the desired detector adjustment values, described in further detail below.

The values for $Sum_i$ and $Total_i$ are used to determine a crystal adjustment value for each crystal (i) in each detector in the system. The $Sum_i$ represents the total of the measured timing differences between the crystal (i) and all other crystals in its same ring that also fall within TFOV$_i$. The Total$_i$ represents the total number of crystals that the timing differences between crystal (i) and others within its same ring and TFOV$_i$ have been accumulated. Therefore, the crystal adjustment value for each individual crystal can be determined by dividing the Sum$_i$ by the Total$_i$ for crystal (i). Once the Sum and Total for each crystal are determined, the process passes to step S258, wherein it returns to step S260.

Detector adjustment values are determined for each detector in step S260. The detector adjustment values for each detector are relative timing adjustments for an individual detector as compared to each detector that is located in an adjacent detector ring or its same ring (i.e., ring difference less than one) and also falls within the detector's fan, or TFOV. Utilizing the histograms constructed from the data collection, timing differences from detector-to-detector are measured. In one embodiment of the invention, the detector-to-detector timing differences (or time delay adjustment values) are calculated as described in U.S. Pat. No. 5,272,344, incorporated herein by reference.

Figure 5:
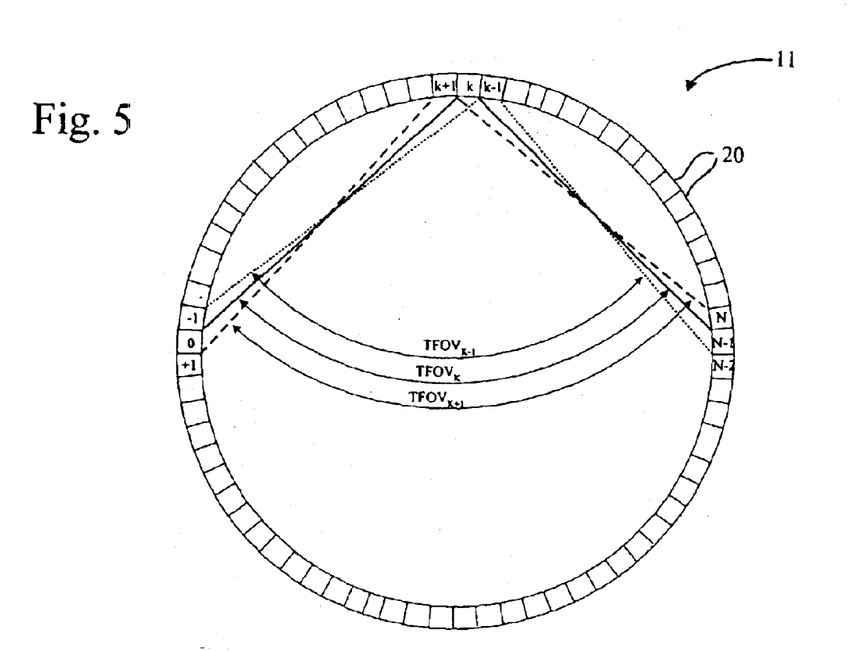
FIG. 5 is a schematic view of a detector ring assembly in accordance with one embodiment of the invention.

FIG. 5 is a schematic view of a detector ring assembly. For calibrating the individual detectors 20, the timing difference relative to the other detectors 20 in detector ring 11 becomes important. As stated above, in this embodiment, detector ring 11 includes seventy (70) detectors 20 in the transaxial view. If detector (k) represents the initial detector with a measured detector adjustment value ($T_k$), i.e., a floating number that is assigned as the reference adjustment value. For detector (k+1), the detector adjustment value ($T_{k+1}$) can be determined by comparing the timing differences between detector (k) and detector (k+1) and other detectors that are found in both the TFOV$_k$ and TFOV$_{k+1}$. This includes the timing values for those rays (θ, R) that lie within the TFOV seen by both detector (k) and detector (k+1). As shown in FIG. 5, TFOV$_k$ (fan k in equation (3) below) includes detectors [0, N−1] and TFOV$_{k+1}$ includes detectors [+1, N]. Therefore, the timing differences that would overlap in TFOV$_k$ and TFOV$_{k+1}$ includes detectors [+1, N−1]. Accordingly, by assigning the initial reference correction Γ equal to zero:

Γ$_{-1}$=0 for k=0 to the last detector, do the following $$T_k = \frac{\left( \sum_{\substack{i=\text{all in fan } k \\ i \neq \text{the last}}} T_{k,i} - \Gamma_{k-1} \right)}{36} \quad (3)$$

Γ$_k$=Γ$_{k-1}$+$T_k$, last in fan k−$T_k$, first in fan k

As described above, detector (k) is examined initially, and in detector ring 11, the adjustment value ($T_k$) is the reference value against which all other detectors in the ring 11 will be calibrated. For the remaining sixty-nine (69) detectors in the ring 11, a reference correction Γ is made for each successive detector. The reference correction Γ is the difference between the average value as seen by the detector (k) and the average value as seen by the next detector (k+1). The detector adjustment value determination continues around the detector ring 11 with a detector adjustment value calculated for each detector using the successive time differences and the reference correction.

Returning to FIG. 3, following the determination of the detector adjustment values, the crystal adjustments values for each crystal are determined in step S280. For an individual crystal, the crystal adjustment value represents the Sum divided by the Total. More specifically, the crystal adjustment value is the total timing difference between the crystal and all other crystals within its TFOV and in the same detector ring divided by the number of crystals in the detector (36). Accordingly, the crystal adjustment value can be represented as follows:

$$\text{ave}(T_k) = \left( \frac{1}{\sum_{\forall i} w_{k,i}} \right) \sum_{\forall i} w_{k,i}(T_k - T_i). \quad (4)$$

wherein, w=sensitivity variation between lines of reference.

It should be appreciated that the TFOV for a crystal includes all of the crystals located within the TFOV of detectors for the crystal's host detector. In this embodiment, the TFOV for a crystal will include two hundred and twenty-two (222) crystals. However, on the crystal level, the number of crystals that are rejected on either side of itself may be unequal.

Figure 6:
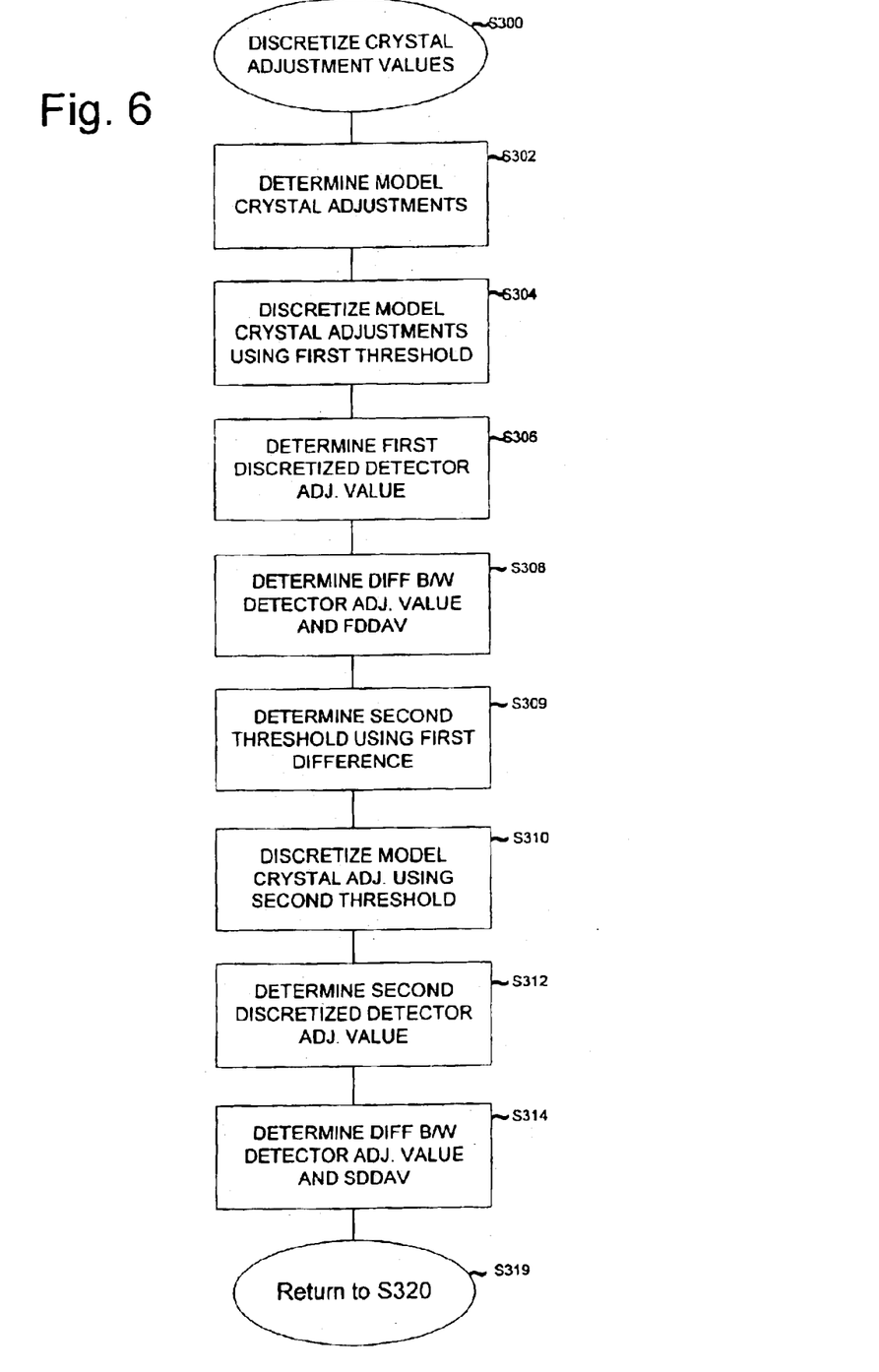
FIG. 6 is an illustrative flowchart showing the "discretize crystal adjustment values" step of FIG. 3 in further detail in accordance with one embodiment of the invention.

The crystal adjustment values are then discretized in step S300. FIG. 6 is an illustrative flowchart showing the "discretize crystal adjustment values" step of FIG. 3 in further detail in accordance with one embodiment of the invention. As shown in FIG. 6, the process begins in step S300, and passes to step S302, in which the model crystal adjustment value for each crystal is determined. The model crystal adjustment value for each crystal is used to reference each crystal with all the other crystals within the same detector. The model crystal adjustment value relates each of the adjustment values in a way similar to the method used for relating the detector adjustment values.

As stated above, the crystal adjustment value for a crystal (k) is represented as follows:

$$\text{ave}(T_k) = \left( \frac{1}{\sum_{\forall i} w_{k,i}} \right) \sum_{\forall i} w_{k,i}(T_k - T_i). \quad (4)$$

When this crystal adjustment value is compared against the crystal adjustment value for crystal (l), in reference to all the same crystals (i) within the overlapping TFOV, the difference between crystals (k) and (l) becomes the difference between their crystal adjustment values. Accordingly, the model crystal adjustment (MCA) for crystal (i) can be represented as follows:

$$MCA_i = \text{ave}(T_i) - \text{ave}(T_j) + DAV_i. \quad (5)$$

wherein:

MCA$_i$=model crystal adjustment for crystal (i)

ave(T$_i$)=crystal adjustment value for crystal (i)

ave(T$_j$)=average of all crystal adjustment values (j) in same detector as crystal (i)

DAV$_i$=detector adjustment value for detector with crystal (i).

Therefore, the model crystal adjustment value for each crystal is the crystal adjustment value for the individual crystal, less the average of all crystal adjustment values within the same detector, plus the detector adjustment value for the detector. The model crystal adjustment value for each crystal is calculated in (floating) units of ticks (or "LSB") used in the acquisition hardware, which stores integers of LSB for correction of detected timing data, i.e., timestamps. In this embodiment, each LSB represents 1.3 nanoseconds, and the floating value for each crystal is discretized to obtain an integer of LSB for digital adjustment of the time stamp generated for an event.

In step S304, the model crystal adjustment value for each crystal is discretized using a first threshold to produce a first discretized crystal adjustment value for each crystal. Prior to discretizing the model crystal adjustment values, in one embodiment, each value should be positive to facilitate more accurate adjustment. A predetermined factor is added to each model crystal adjustment value, as well as the detector adjustment value for purposes of the discretization. The model crystal adjustment value is then discretized using a fixed cut-off value, or first threshold. The first threshold is added to the model crystal adjustment value for each crystal, and the Integer of the result is obtained. In this embodiment, the first threshold is 0.5 LSB. Accordingly, when the floating model crystal adjustment value for each crystal is discretized using 0.5 LSB, each crystal will have a quantization error uniformly distributed over a range of ±0.5 LSB.

The first discretized crystal adjustment value for each crystal in a detector is then used to determine a first average discretized crystal adjustment for each detector in step S306. Using the first average discretized crystal adjustment for each detector, a first difference for each detector is determined, in step S308, representing the first average discretized crystal adjustment less the detector adjustment value. The first difference represents the amount of error generated when utilizing the first discretized crystal adjustment values to calibrate the individual crystals. However, the quantization error for the detector adjustment value can be further reduced if each model crystal adjustment value is discretized such that the detector adjustment value is maintained.

Using the first difference, a second threshold for discretizing the model crystal adjustment values is determined in step S309. The second threshold is determined as follows:

$$\text{Second Threshold} = (\text{LSB} - 0.5 \times (\text{LSB} + \text{first difference})) \quad (6)$$

The model crystal adjustment value for each crystal is discretized using the second threshold to produce a second discretized crystal adjustment value for each crystal in step S310. The predetermined factor is added to each model crystal adjustment value, as well as the detector adjustment value for purposes of the discretization. The model crystal adjustment value is then discretized using the second threshold. The second threshold is added to the model crystal adjustment value for each crystal, and the Integer of the result is obtained. In this embodiment, the second threshold is 0.5 LSB−(first difference/2).

The second discretized crystal adjustment value for each crystal in each detector is then used to determine a second average discretized crystal adjustment for each detector in step S312. Using the second average discretized crystal adjustment for each detector, a second difference for each detector is determined, in step S314, representing the second average discretized crystal adjustment less the detector adjustment value. Then, in step S319, the process returns to step S320. Lastly, the discretized crystal adjustment values are applied to each crystal in step S320.

Figure 7:
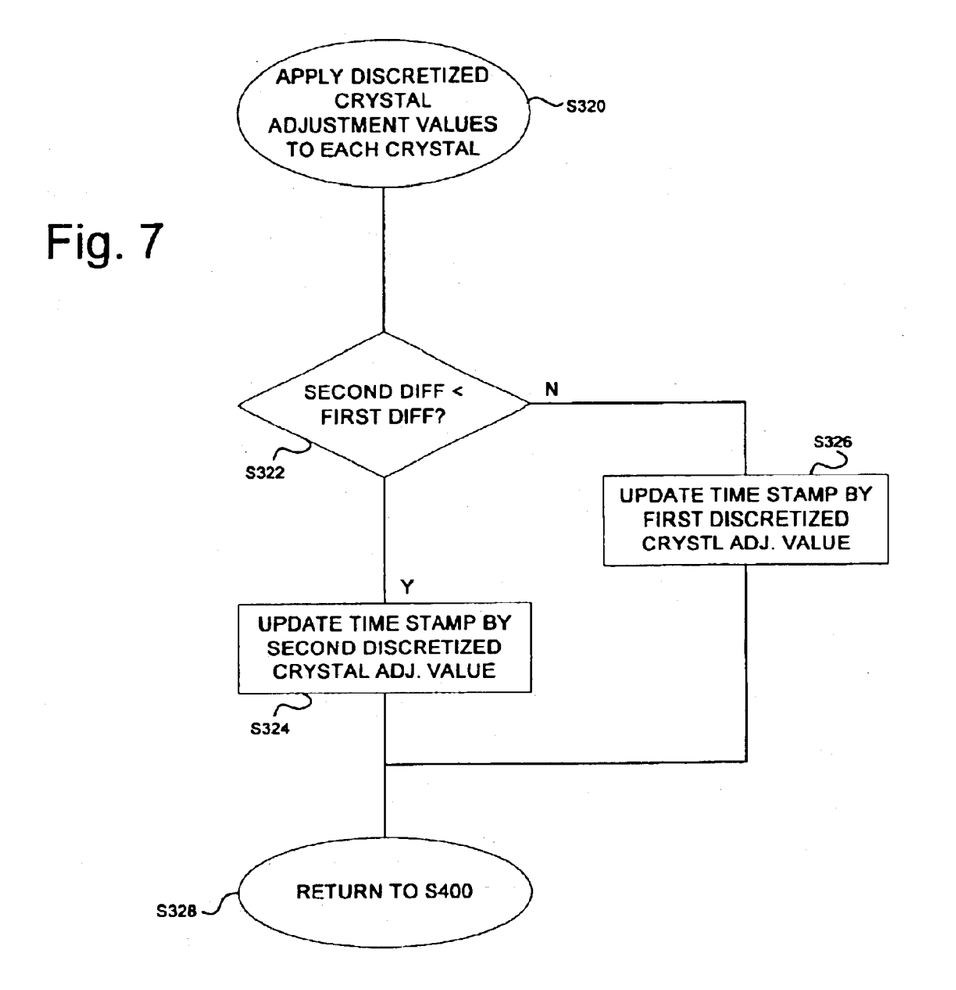
FIG. 7 is an illustrative flowchart showing the "apply discretized crystal adjustment values to each crystal" of FIG. 3 in accordance with one embodiment of the invention.

FIG. 7 is an illustrative flowchart showing the "apply discretized crystal adjustment values to each crystal" of FIG. 3 in accordance with one embodiment of the invention. As shown in FIG. 7, the process begins in step S320, and passes to step S322, wherein a determination is made whether the second difference is less than the first difference for each detector. If the second difference is less than the first difference, the process passes to step S324. In step S324, the coincidence timing for the detector is calibrated by applying the second discretized crystal adjustment value for each crystal in the detector to the collected timing data indicative of coincidence events.

Figure 8:
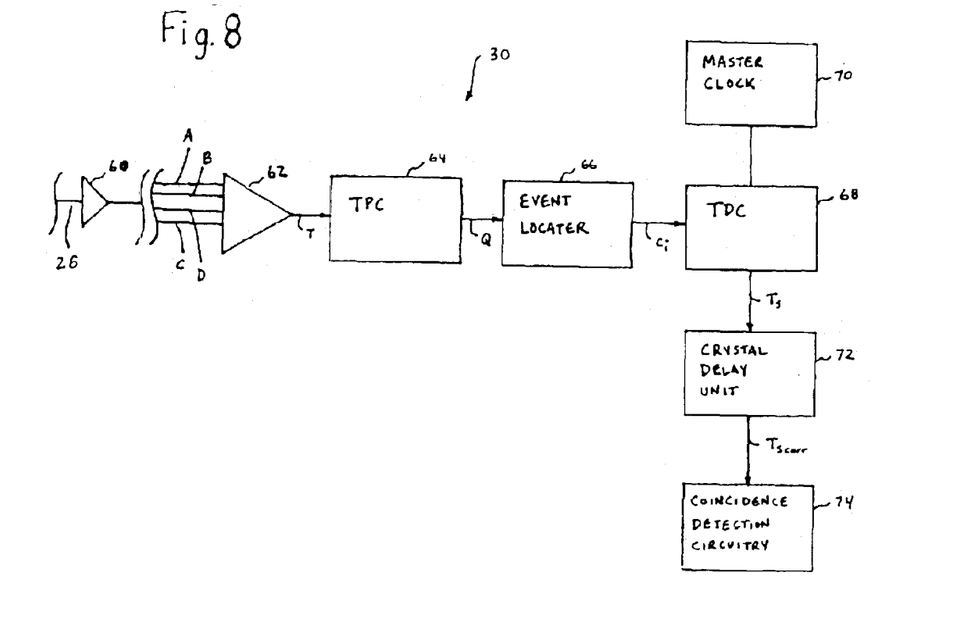
FIG. 8 is a schematic of the ALC circuitry in accordance with one embodiment of the invention.

Otherwise, if the second difference is greater than or equal to the first difference, the coincidence timing for the detector is calibrated by applying the first discretized ideal crystal adjustment value for each crystal in the detector to the collected timing data indicative of coincidence events in step S326. It should be appreciated that the predetermined amount added during discretization is subtracted from the discretized crystal adjustment values before each value is stored for calibrating the individual crystals. It should be appreciated that following the determination of the discretized crystal adjustment value that will be applied to each individual crystal, these values are applied to the time stamp for each coincidence event data packet through the ALC circuity 30. FIG. 8 is a schematic of the ALC circuitry in accordance with one embodiment of the invention.

ALC circuitry 30, for each detector, includes pre-amplifiers 60, summer 62, timing pickoff circuit ("TPC") 64, event locator 66, time to digital converter ("TDC") 68, master clock 70, crystal delay unit 72, and coincidence detection circuitry 74. A separate pre-amplifier 60 is provided for each PMT 22 in each detector 20. Each pre-amplifier 60 receives a separate one of the intensity signals 23A–23D via a bus 26 and amplifies the intensity signal such that the resulting signal is at a suitable level for signal processing. The amplified signals corresponding to the four PMTs in each detector 20 are provided to summer 62, which sums the amplified signals generating a total energy signal T for detector 20. Signal T is provided to TPC 64.

TPC 64 compares received signal T to a threshold energy value which likely indicates an event occurrence (i.e., a scintillation event). In this embodiment, the threshold energy level is 100 keV. When signal T exceeds the threshold energy level, TPC 64 generates an event detection pulse ("EDP") Q which is provided to event locater 66. Event locater 66 determines the crystal addresses for those crystal involved in the event, and passes the crystal identifier Ci. Then, Q is provided to TDC 68, which also receives a master clock signal from master clock 70. TDC 68 generates an 8-bit time stamp Ts, referenced from the most recent master clock signal and provides the time stamp Ts to crystal delay unit 72. Crystal delay unit 72 adds the discretized crystal adjustment value to the Ts to produce a corrected time stamp $Ts_{corr}$, which is provided to coincidence detection circuitry 74. Corrected time stamp $Ts_{corr}$ indicates within a matter of nanoseconds the precise time when a scintillation event occurred. Returning to FIG. 7, once the discretized crystal adjustment values are applied to the timing data, the process passes to step S328, wherein it returns to step S400 and ends.

Figure 9:
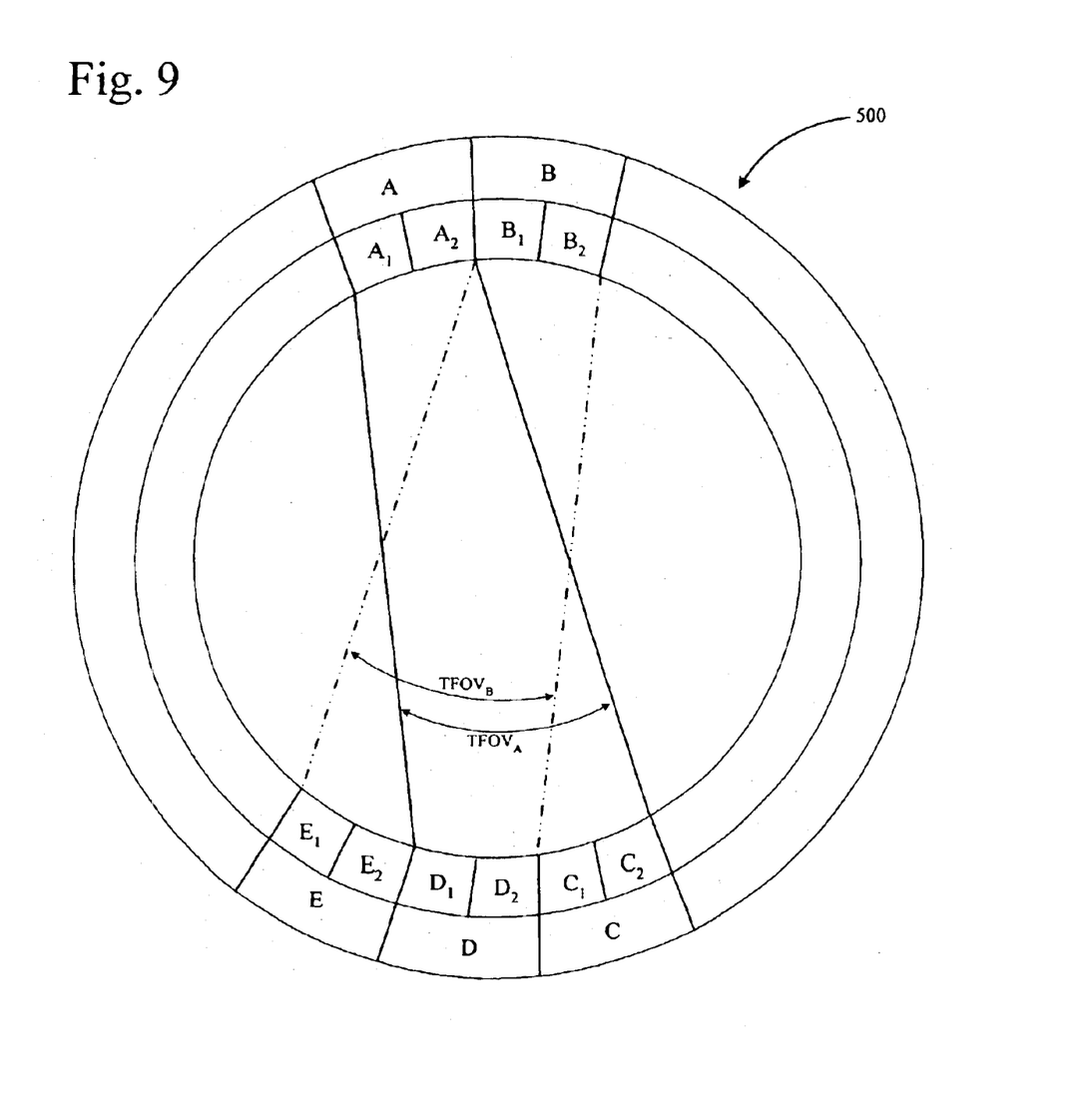
FIG. 9 is a schematic view of a detector ring assembly in accordance with one embodiment of the invention.

To provide further understanding on how the discretized crystal level adjustments are determined, and the use of the alternative (second) threshold may provide better adjustment, consider the following example. FIG. 9 is an illustrative detector ring in accordance with yet another embodiment of the invention. For purposes of this example, assume detector ring 500 includes only five detectors A, B, C, D and E, each of which is shown in the transaxial view of FIG. 9 (as opposed to the 280 detectors in the embodiment illustrated in FIG. 5 and described above—70 (transaxially) by 4 (axially)). Further assume that each detector A, B, C, D and E, includes only two crystals each, $A_1$ and $A_2$, $B_1$ and $B_2$, $C_1$ and $C_2$, $D_1$ and $D_2$, and $E_1$ and $E_2$, respectively. In this example, the field of view for detector A, $TFOV_A$, includes detectors C and D, and the field of view for detector B, $TFOV_B$, includes detectors D and E. Assume further that the individual timing adjustment for each crystal are shown in the following Table 1:

TABLE 1

| Detector | Crystal | Adj. Value (LSB) | Crystal | Adj. Value (LSB) |
|---|---|---|---|---|
| A | $A_1$ | −0.9 | $A_2$ | 2.1 |
| B | $B_1$ | −1.4 | $B_2$ | −1.2 |
| C | $C_1$ | −2.4 | $C_2$ | −1.6 |
| D | $D_1$ | 3.8 | $D_2$ | 2.2 |
| E | $E_1$ | 0.9 | $E_2$ | 1.1 |

To determine the detector adjustment values for A and B, the detector-to-detector timing differences must be analyzed. For detector A, the differences between A–C and A–D, and for detector B, the differences between B–D and B–E, can be observed as follows:

$$A-C=[(A_1-C_1)+(A_1-C_2)+(A_2-C_1)+(A_2-C_2)]/\#\text{differences}$$

$$A-D=[(A_1-D_1)+(A_1-D_2)+(A_2-D_1)+(A_2-D_2)]/\#\text{differences}$$

$$B-D=[(B_1-D_1)+(B_1-D_2)+(B_2-D_1)+(B_2-D_2)]/\#\text{differences}$$

$$B-E=[(B_1-E_1)+(B_1-E_2)+(B_2-E_1)+(B_2-E_2)]/\#\text{differences}$$

therefore, A–C is equal to 2.6 LSB, A–D is equal to −2.4 LSB, B–D is equal to −4.3 LSB, and B–E is equal to −2.3 LSB. Now, using equation (3) from above, the detector adjustment values for detectors A and B can be represented as follows:

$$T_A=[(A-C)-\Gamma_A]/1=2.6 \text{ LSB}$$

wherein, $$\Gamma_A=0\text{LSB (for the initial detector)}$$

therefore, $$T_B=[(B-D)-\Gamma_B]/1=0.7 \text{ LSB}$$

wherein $$\Gamma_B=[(\Gamma_A)+(A-D)-(A-C)]=-5.0 \text{ LSB}.$$

Accordingly, the detector adjustment value for detector A is 2.6 LSB, which becomes the reference, and the detector adjustment value for detector B, updated by the incremental time delay of −5.0 LSB, is 0.7 LSB. Then, the crystal level adjustment values must be determined.

As stated above, the timing differences for each crystal were collected, and are shown in Table 1. The individual crystal level adjustment values can be represented as follows:

$$A_1=[(A_1-C_1)+(A_1-C_2)+(A_1-D_1)+(A_1-D_2)]/\#\text{differences}$$

$$A_2=[(A_2-C_1)+(A_2-C_2)+(A_2-D_1)+(A_2-D_2)]/\#\text{differences}$$

$$B_1=[(B_1-D_1)+(B_1-D_2)+(B_1-E_1)+(B_1-E_2)]/\#\text{differences}$$

$$B_2=[(B_2-D_1)+(B_2-D_2)+(B_2-E_1)+(B_2-E_2)]/\#\text{differences}.$$

Therefore, the crystal level adjustment of $A_1$ is equal to −1.4 LSB, $A_2$ is equal to 1.6 LSB, $B_1$ is equal to −3.4 LSB, and $B_2$ is equal to −3.2 LSB. The average crystal level adjustment for detector A is 0.1 LSB, and for detector B is −3.3 LSB. The model crystal level adjustment for each crystal can be represented as follows:

$$MCA_{A1}=A_1-ave(\text{detector A})+T_A=[(-1.4)-(0.1)+(2.6)]=1.1 \text{ LSB}$$

$$MCA_{A2}=A_2-ave(\text{detector A})+T_A=[(1.6)-(0.1)+(2.6)]=4.1 \text{ LSB}$$

$$MCA_{B1}=B_1-ave(\text{detector B})+T_B=[(-3.4)-(-3.3)+(0.7)]=0.6 \text{ LSB}$$

$$MCA_{B2}=B_2-ave(\text{detector B})+T_B=[(-3.2)-(-3.3)+(0.7)]=0.8 \text{ LSB}.$$

Note here the difference of the model crystal adjustment ($MCA_{A1}$, $MCA_{A2}$, $MCA_{B1}$, $MCA_{B2}$)=(1.1, 4.1, 0.6, 0.8) are the same as what we have started out to assume ($A_1$, $A_2$, $B_1$, $B_2$)=(−0.9, 2.1, −1.4, −1.2). So the calculated model crystal adjustment is the same as the observed adjustment with an offset. For timing adjustment, this is all we need to achieve.

The model crystal adjustment values are then discretized. First, a predetermined amount, or a large integer is added to each value to make the result positive. In this example, the amount added to each value is 10 LSB. Second, the first threshold (0.5 LSB) is added to each result. The integer of each value is then determined as follows:

$$DCA_{A1}=I[(MCA_{A1})+(10)+(0.5)]=11 \text{ LSB}$$

$$DCA_{A2}=I[(MCA_{A2})+(10)+(0.5)]=14 \text{ LSB}$$

$$DCA_{B1}=I[(MCA_{B1})+(10)+(0.5)]=11 \text{ LSB}$$

$$DCA_{B2}=I[(MCA_{B2})+(10)+(0.5)]=11 \text{ LSB}.$$

The first discretized crystal adjustment values are then used to determine a first average discretized crystal adjustment for each detector A and B, which is 12.5 LSB and 11 LSB, respectively. Therefore, the first difference for detector A and B is −0.1 LSB and 0.3 LSB, respectively.

Using the first difference, the new (second) threshold is determined. The second threshold can be represented as follows:

$$\text{Second Threshold}_A=(LSB-0.5\times(LSB+\text{first difference}_A))=0.55 \text{ LSB}$$

$$\text{Second Threshold}_B=(LSB-0.5\times(LSB+\text{first differences}))=0.35 \text{ LSB}.$$

The second discretized crystal adjustment values are determined as follows:

$$SDCA_{A1}=I[(MCA_{A1})+(10)+(\text{Second Threshold}_A)]=11 \text{ LSB}$$

$$SDCA_{A2}=I[(MCA_{A2})+(10)+(\text{Second Threshold}_A)]=14 \text{ LSB}$$

$$SDCA_{B1}=I[(MCA_{B1})+(10)+(\text{Second Threshold}_B)]=10 \text{ LSB}$$

$$SDCA_{B2}=I[(MCA_{B2})+(10)+(\text{Second Threshold}_B)]=11 \text{ LSB}.$$

As shown above, the second discretized crystal adjustment values for crystals $A_1$ and $A_2$ remained the same, thus, the second difference$_A$ will not be lower than the first differences$_A$. Accordingly, for detector A, the first discretized crystal adjustment values, less the predetermined amount added for discretization, will be applied to crystals $A_1$ (1 LSB) and $A_2$ (4 LSB).

However, for detector B, the second average discretized crystal adjustment is 10.5 LSB. Therefore, the second difference$_B$ for detector B is −0.2 LSB, whose absolute value is smaller than the absolute value of the first difference$_B$. In this circumstance, the second discretized crystal adjustment values, less the predetermined amount added for discretization, will be applied to the crystals $B_1$ (0 LSB) and $B_2$ (1 LSB).

As described above with reference to various embodiments of the invention, the PET system, or various components thereof, may receive input from or send output to a processing machine to accomplish the desired function of the invention. It should be appreciated that the PET system, or components thereof, may receive commands from a controller workstation through a processing machine, or other mechanical components electronically coupled to or in communication with a processing machine. As used herein, the term "processing machine" is to be understood to include at least one processor that uses at least one memory. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described. Such a set of instructions for performing a particular task may be characterized as a program, software program, or simply software. As noted above, the processing machine executes the instructions that are stored in the memory or memories to process data. This processing of data may be in response to commands by a user or users of the processing machine, in response to previous processing, in response to a request by another processing machine and/or any other input, for example.

The processing machine used to implement the invention may be a general purpose computer. However, the processing machine described above may also utilize any of a wide variety of other technologies including a special purpose computer, a computer system including a microcomputer, mini-computer or mainframe, a programmed microprocessor, a micro-controller, an integrated circuit, a logic circuit, a digital signal processor, a programmable logic device, or any other device or arrangement of devices that is capable of implementing the invention.

Many embodiments and adaptations of the present invention other than those herein described, as well as many variations, modifications and equivalent arrangements, will be apparent from or reasonably suggested to those skilled in the art by the present invention and foregoing description thereof, without departing from the substance or scope of the invention.

While the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of calibrating detectors in a detector ring of a PET scanner, each detector including a plurality of crystals, the PET scanner having a field of view, comprising the steps of:
    collecting timing data indicative of coincidence events occurring between each pair of crystals within the field of view;
    determining a detector adjustment value for each detector;
    determining a crystal adjustment value for each crystal in each detector;
    discretizing the crystal adjustment value for each crystal to produce a discretized crystal adjustment value for each crystal; and
    calibrating each detector by applying the discretized crystal adjustment value for each crystal in each detector to the collected timing data indicative of coincidence events.

2. A method of calibrating the coincidence timing of a PET imaging system including a plurality of detector rings, each detector ring including a plurality of detectors with a plurality of detector crystals, comprising the steps of:
    collecting timing data indicative of coincidence events occurring between pairs of crystals within a field of view of the imaging system;
    determining a detector adjustment value for each detector;
    determining a crystal adjustment value for each crystal in each detector;
    determining an average crystal adjustment for each detector;
    determining a model crystal adjustment value for each crystal in each detector;
    discretizing the model crystal adjustment value for each crystal using a first threshold to produce a first discretized crystal adjustment value for each crystal;
    determining a first average discretized crystal adjustment for each detector;
    determining a first difference for each detector, the first difference representing the first average discretized crystal adjustment less the detector adjustment value;
    determining a second threshold for each detector using the first difference;
    discretizing the model crystal adjustment value for each crystal using the second threshold to produce a second discretized crystal adjustment value for each crystal;
    determining a second average discretized crystal adjustment for each detector;
    determining a second difference for each detector, the second difference representing the second average discretized crystal adjustment less the detector adjustment value; and
    calibrating each detector by applying the second discretized crystal adjustment value for each crystal in the detector to the collected timing data indicative of coincidence events if the second difference is less than the first difference, and applying the first discretized ideal crystal adjustment value for each crystal in the detector to the collected timing data indicative of coincidence events if the second difference is equal to or greater than first difference.

3. The method of claim 2, wherein the crystal adjustment value for a crystal (i) is equal to the total of the measured timing differences between the crystal (i) and all other crystals (j) in the detector ring containing crystal (i) that are located within a TFOV(i) for crystal (i).

4. The method of claim 2, wherein the average crystal adjustment for each detector is the average of each crystal adjustment value for all crystals in the detector.

5. The method of claim 2, wherein the model crystal adjustment value for crystal (i) is the crystal adjustment value for crystal (i), less the average crystal adjustment for the detector containing crystal (i), plus the detector adjustment value for the detector containing crystal (i).

6. The method of claim 2, wherein the model crystal adjustment value for each crystal is calculated in floating units of ticks, LSB.

7. The method of claim 6, wherein each LSB represents 1.3 nanoseconds.

8. The method of claim 2, wherein the step of discretizing the model crystal adjustment value for each crystal using a first threshold further includes:
    adding the first threshold to the model crystal adjustment value for each crystal to produce a first threshold result; and
    producing a first discretized crystal adjustment value for each crystal by determining integer of the first threshold result.

9. The method of claim 2, wherein the first threshold is LSB/2.

10. The method of claim 2, wherein the first average discretized crystal adjustment for a detector represents the average of the first discretized crystal adjustment value for each crystal within the detector.

11. The method of claim 2, wherein the second threshold is represented by the first threshold less the first difference divided by two.

12. The method of claim 2, wherein the step of discretizing the model crystal adjustment value for each crystal using the second threshold further includes:
adding the second threshold to the model crystal adjustment value for each crystal to produce a second threshold result; and
producing a second discretized crystal adjustment value for each crystal by determining integer of the second threshold result.

13. The method of claim 2, wherein the second average discretized crystal adjustment for a detector represents the average of the second discretized crystal adjustment value for each crystal within the detector.

14. A method of calibrating the coincidence timing of a detector in a PET imaging system, the detector including a plurality of detector crystals, comprising the steps of:
collecting timing data indicative of coincidence events occurring between pairs of crystals within a field of view of the imaging system;
determining a detector adjustment value for a detector;
determining a crystal adjustment value for each crystal in the detector;
determining an average crystal adjustment for the detector;
determining a model crystal adjustment value for each crystal in the detector;
discretizing the model crystal adjustment value for each crystal using a first threshold to produce a first discretized crystal adjustment value for each crystal;
determining a first average discretized crystal adjustment for the detector;
determining a first difference for the detector, the first difference representing the first average discretized crystal adjustment less the detector adjustment value;
determining a second threshold for the detector using the first difference;
discretizing the model crystal adjustment value for each crystal using the second threshold to produce a second discretized crystal adjustment value for each crystal;
determining a second average discretized crystal adjustment for the detector;
determining a second difference for the detector, the second difference representing the second average discretized crystal adjustment less the detector adjustment value; and
calibrating the detector by applying the second discretized crystal adjustment value for each crystal in the detector to the collected timing data indicative of coincidence events if the second difference is less than the first difference, and applying the first discretized ideal crystal adjustment value for each crystal in the detector to the collected timing data indicative of coincidence events if the second difference is equal to or greater than first difference.

15. The method of claim 14, wherein the crystal adjustment value for crystal (i) is equal to the total of the measured timing differences between the crystal (i) and all other crystals (j) in the detector ring containing crystal (i) that are located within a TFOV(i) for crystal (i).

16. The method of claim 14, wherein the average crystal adjustment for each detector is the average of each crystal adjustment value for all crystals in the detector.

17. The method of claim 14, wherein the model crystal adjustment value for crystal (i) is the crystal adjustment value for crystal (i), less the average crystal adjustment for the detector containing crystal (i), plus the detector adjustment value for the detector containing crystal (i).

18. The method of claim 14, wherein the model crystal adjustment value for each crystal is calculated in floating units of ticks, LSB.

19. The method of claim 18, wherein each LSB represents 1.3 nanoseconds.

20. The method of claim 14, wherein the step of discretizing the model crystal adjustment value for each crystal using a first threshold further includes:
adding the first threshold to the model crystal adjustment value for each crystal to produce a first threshold result; and
producing a first discretized crystal adjustment value for each crystal by determining integer of the first threshold result.

21. The method of claim 14, wherein the first threshold is LSB/2.

22. The method of claim 14, wherein the first average discretized crystal adjustment for a detector represents the average of the first discretized crystal adjustment value for each crystal within the detector.

23. The method of claim 14, wherein the second threshold is represented by the first threshold less the first difference divided by two.

24. The method of claim 14, wherein the step of discretizing the model crystal adjustment value for each crystal using the second threshold further includes:
adding the second threshold to the model crystal adjustment value for each crystal to produce a second threshold result; and
producing a second discretized crystal adjustment value for each crystal by determining integer of the second threshold result.

25. The method of claim 14, wherein the second average discretized crystal adjustment for a detector represents the average of the second discretized crystal adjustment value for each crystal within the detector.

26. The method of claim 14, wherein the determining a crystal adjustment value for each crystal in the detector further includes:
utilizing timing data for coincidence events occurring between each crystal and other crystals within a same detector ring to determine the crystal adjustment value for each crystal in the detector.

27. The method of claim 14, wherein the determining a crystal adjustment value for each crystal in the detector further includes:
utilizing timing data for coincidence events occurring within a crystal timing window to determine the crystal adjustment value for each crystal in the detector.

28. The method of claim 27, wherein the crystal timing window is 15 LSB.

29. A system for calibrating detectors in a detector ring of a PET scanner, each detector including a plurality of crystals, the PET scanner having a field of view, comprising the steps of:

means for collecting timing data indicative of coincidence events occurring between each pair of crystals within the field of view;

means for determining a detector adjustment value for each detector;

means for determining a crystal adjustment value for each crystal in each detector;

means for discretizing the crystal adjustment value for each crystal to produce a discretized crystal adjustment value for each crystal; and means for calibrating each detector by applying the discretized crystal adjustment value for each crystal in each detector to the collected timing data indicative of coincidence events.

30. A system for calibrating the coincidence timing of a detector in a PET imaging system, the detector including a plurality of detector crystals, comprising the steps of:

means for collecting timing data indicative of coincidence events occurring between pairs of crystals within a field of view of the imaging system;

means for determining a detector adjustment value for a detector;

means for determining a crystal adjustment value for each crystal in the detector;

means for determining an average crystal adjustment for the detector;

means for determining a model crystal adjustment value for each crystal in the detector;

means for discretizing the model crystal adjustment value for each crystal using a first threshold to produce a first discretized crystal adjustment value for each crystal;

means for determining a first average discretized crystal adjustment for the detector;

means for determining a first difference for the detector, the first difference representing the first average discretized crystal adjustment less the detector adjustment value;

means for determining a second threshold for the detector using the first difference;

means for discretizing the model crystal adjustment value for each crystal using the second threshold to produce a second discretized crystal adjustment value for each crystal;

means for determining a second average discretized crystal adjustment for the detector;

means for determining a second difference for the detector, the second difference representing the second average discretized crystal adjustment less the detector adjustment value; and means for calibrating the detector by applying the second discretized crystal adjustment value for each crystal in the detector to the collected timing data indicative of coincidence events if the second difference is less than the first difference, and applying the first discretized ideal crystal adjustment value for each crystal in the detector to the collected timing data indicative of coincidence events if the second difference is equal to or greater than first difference.

* * * * *